US011203352B2

(12) United States Patent
Stählin et al.

(10) Patent No.: US 11,203,352 B2
(45) Date of Patent: Dec. 21, 2021

(54) CONTROLLER FOR A MOTOR VEHICLE AND METHOD FOR OPERATING THE CONTROLLER

(71) Applicant: Continental Teves AG & Co. oHG, Frankfurt am Main (DE)

(72) Inventors: Ulrich Stählin, Nuremberg (DE); Jürgen Kunz, Nuremberg (DE)

(73) Assignee: CONTINENTAL TEVES AG & CO. OHG, Frankfurt am Main (DE)

( * ) Notice: Subject to any disclaimer, the term of this patent is extended or adjusted under 35 U.S.C. 154(b) by 48 days.

(21) Appl. No.: 16/646,253

(22) PCT Filed: Nov. 7, 2018

(86) PCT No.: PCT/DE2018/200100
§ 371 (c)(1),
(2) Date: Mar. 11, 2020

(87) PCT Pub. No.: WO2019/091519
PCT Pub. Date: May 16, 2019

(65) Prior Publication Data
US 2020/0283009 A1    Sep. 10, 2020

(30) Foreign Application Priority Data
Nov. 8, 2017  (DE) .................. 10 2017 219 869.9

(51) Int. Cl.
*B60W 50/04*      (2006.01)
*B60W 20/00*      (2016.01)
(Continued)

(52) U.S. Cl.
CPC .......... *B60W 50/045* (2013.01); *B60W 20/00* (2013.01); *B60W 40/12* (2013.01);
(Continued)

(58) Field of Classification Search
CPC .................................................. B60W 50/045
See application file for complete search history.

(56) References Cited

U.S. PATENT DOCUMENTS

| 8,495,582 B2 * | 7/2013 | Drebinger | G06F 8/656 |
| | | | 717/127 |
| 9,092,288 B2 * | 7/2015 | Nagai | G06F 8/61 |
| (Continued) | | | |

FOREIGN PATENT DOCUMENTS

| DE | 112013005705 T5 | 9/2015 |
| EP | 1916583 A1 | 4/2008 |
| (Continued) | | |

OTHER PUBLICATIONS

German Search Report for German Application No. 10 2017 219 869.9, with partial translation, dated Nov. 8, 2018, 8 pages.
(Continued)

*Primary Examiner* — Shelley Chen
(74) *Attorney, Agent, or Firm* — RatnerPrestia

(57) ABSTRACT

A motor vehicle controller performs one or more control and/or monitoring functions. The controller includes a processor which determines a first utilization level of the controller during the motor vehicle's travel mode, and a communication interface which receives program code. The program code defines a new control and/or monitoring function of the controller and/or modifies a control and/or monitoring function of the controller. The processor further determines a second utilization level of the controller in the motor vehicle's standstill mode. The program code is the basis for performing the controller's new control and/or monitoring function and/or the modified control and/or monitoring function of the controller, and take the first and second utilization levels as basis for deciding to perform the controller's new control and/or monitoring function and/or the controller's modified control and/or monitoring function (Continued)

in the vehicle's travel mode. A corresponding method for operating such a controller is also disclosed.

16 Claims, 1 Drawing Sheet

(51) Int. Cl.
*B60W 40/12* (2012.01)
*G05B 19/042* (2006.01)
(52) U.S. Cl.
CPC ..... *G05B 19/0426* (2013.01); *B60W 2300/12* (2013.01); *B60W 2300/36* (2013.01); *B60W 2556/45* (2020.02); *G05B 2219/45018* (2013.01)

(56) References Cited

U.S. PATENT DOCUMENTS

| | | | | |
|---|---|---|---|---|
| 9,268,335 | B2* | 2/2016 | Taira | G05D 1/0231 |
| 9,524,160 | B2* | 12/2016 | Takahashi | G06F 13/00 |
| 10,152,835 | B2* | 12/2018 | Hizaki | B60Q 9/00 |
| 2008/0130302 | A1* | 6/2008 | Watanabe | B60Q 1/085 |
| | | | | 362/466 |
| 2010/0063605 | A1* | 3/2010 | Drebinger | G06F 8/656 |
| | | | | 700/81 |
| 2012/0124571 | A1* | 5/2012 | Nagai | G06F 8/61 |
| | | | | 717/173 |
| 2012/0312604 | A1* | 12/2012 | Fujii | G01G 19/4142 |
| | | | | 177/1 |
| 2015/0178070 | A1 | 6/2015 | Doi | |
| 2015/0234384 | A1* | 8/2015 | Taira | G05D 1/0255 |
| | | | | 701/23 |
| 2015/0301822 | A1* | 10/2015 | Takahashi | G06F 8/654 |
| | | | | 717/173 |
| 2016/0316624 | A1* | 11/2016 | Ritter | A01D 41/127 |
| 2017/0021820 | A1* | 1/2017 | Ogawa | B60W 10/06 |
| 2017/0345306 | A1* | 11/2017 | Mutou | H04N 5/367 |
| 2018/0158262 | A1* | 6/2018 | Hizaki | G01C 21/3697 |
| 2019/0087169 | A1 | 3/2019 | Arai | |
| 2019/0347810 | A1* | 11/2019 | Yokoyama | G06K 9/00791 |

FOREIGN PATENT DOCUMENTS

| | | |
|---|---|---|
| EP | 2453354 A1 | 5/2012 |
| WO | 2017149824 A1 | 9/2017 |

OTHER PUBLICATIONS

International Search Report and Written Opinion for International Application PCT/DE2018/200100, dated Feb. 15, 2019, 8 pages.

* cited by examiner

CONTROLLER FOR A MOTOR VEHICLE AND METHOD FOR OPERATING THE CONTROLLER

CROSS REFERENCE TO RELATED APPLICATIONS

This application is the U.S. National Phase Application of PCT International Application No. PCT/DE2018/200100, filed Nov. 7, 2018, which claims priority to German Patent Application No. 10 2017 219 869.9, filed Nov. 8, 2017, the contents of such applications being incorporated by reference herein.

FIELD OF THE INVENTION

The present invention relates in general to controllers for motor vehicles. In particular, the invention relates to a motor vehicle controller for performing a control and/or monitoring function as well as a method for operating such a controller.

BACKGROUND OF THE INVENTION

In modern motor vehicles, control and monitoring functions in particular are increasingly carried out by electronic controllers. A known example of such an electronic controller is the engine controller which is also known as an Engine Control Unit (ECU). Such control and monitoring functions are frequently implemented in the form of a program code which is saved in a memory of an electronic controller and is run during operation by a processor unit of the electronic controller. Due to the long service life of a motor vehicle it can, however, be necessary that an original program code, which implements one or more control and/or monitoring functions of a motor vehicle controller, has to be updated or respectively modified, for example because a malfunction of the program code has been discovered. Similarly, it can occur that new control and/or monitoring functions are to be implemented on a motor vehicle controller by installing a corresponding program code on the motor vehicle controller. The existing functions can be updated or respectively new functions can be loaded, for example, by means of a method known as FOTA (Flashing over the Air).

However, the problem can occur that, due to the performance of an updated function and/or a new function, the operation of the corresponding motor vehicle controller can be disrupted. For example, recourse can be had to the computing and/or storage capacities of a corresponding motor vehicle controller by an updated or respectively new function in such a way that there are not sufficient capacities available for existing functions of the corresponding motor vehicle controller.

SUMMARY OF THE INVENTION

An aspect of the present invention is an improved controller for performing a control and/or monitoring function in a motor vehicle as well as an improved method for operating such a controller.

According to a first aspect, the invention relates to a controller for a motor vehicle, wherein the controller is designed to perform one or more control and/or monitoring functions of the motor vehicle. The controller comprises a processor unit which is designed to determine a first utilization level of the controller during the travel mode of the motor vehicle, and a communication interface which is designed to receive a program code, wherein the program code defines a new control and/or monitoring function of the controller and/or modifies a control and/or monitoring function of the controller. The processor unit is further designed to determine a second utilization level of the controller in the standstill mode of the motor vehicle, in which the program code is taken as a basis for performing the new control and/or monitoring function of the controller and/or the modified control and/or monitoring function of the controller, and to take the first utilization level and the second utilization level as a basis for deciding to perform the new control and/or monitoring function of the controller and/or the modified control and/or monitoring function of the controller in the travel mode of the motor vehicle.

According to an embodiment, the processor unit is designed to capture a course of the utilization level of the controller over a predetermined time interval during the travel mode and to determine a maximum value of the course of the utilization level of the controller as the first utilization level of the controller.

According to an embodiment, the controller has a maximum utilization capacity and the processor unit is designed to perform the new control and/or monitoring function of the controller and/or the modified control and/or monitoring function of the controller in the travel mode of the motor vehicle, if the total of the first utilization level and the second utilization level is not greater than the maximum utilization capacity of the controller.

According to an embodiment, the processor unit is designed to collect and/or generate input data during the determination of the first utilization level of the controller in the travel mode of the motor vehicle, and to perform the new control and/or monitoring function of the controller and/or the modified control and/or monitoring function of the controller with the input data in the standstill mode of the motor vehicle, in order to determine the second utilization level of the controller.

According to an embodiment, the control and/or monitoring function comprises an image camera processing function, a person detecting function, an automatic parking function and/or an automatic forward lighting switching function, but also any other software-designed function which is available in the vehicle.

According to an embodiment, the second utilization level comprises the computing utilization of the processor unit of the controller during the performance of the new control and/or monitoring function of the controller and/or the modified control and/or monitoring function of the controller.

According to an embodiment, the controller further comprises a storage unit which is designed to store the program code.

According to an embodiment, the second utilization level comprises the storage utilization of the storage unit of the controller during the volatile or non-volatile storage of data which occur in connection with the performance of the new control and/or monitoring function of the controller and/or the modified control and/or monitoring function of the controller. According to an embodiment, the communication interface is designed to receive the program code via an air interface.

According to an embodiment, the communication interface is designed to receive the program code via a communication network, in particular a mobile radio communication network, from a backend server.

According to an embodiment, the controller comprises a real-time operating system which is run by the processor unit, and the control and/or monitoring function is part of the real-time operating system.

According to a second aspect, the invention relates to a motor vehicle having a controller according to the first aspect of the invention. The motor vehicle can be a passenger vehicle, a truck, an automobile, a motorcycle, an electric vehicle or a hybrid vehicle.

According to a third aspect, the invention relates to a corresponding method for operating a controller for a motor vehicle, wherein the controller is designed to perform one or more control and/or monitoring functions. The method comprises the steps of: determining a first utilization level of the controller during the travel mode of the motor vehicle; receiving a program code, wherein the program code defines a new control and/or monitoring function of the controller and/or modifies a control and/or monitoring function of the controller; determining a second utilization level of the controller in the standstill mode of the motor vehicle, during which the program code is taken as a basis for performing the new control and/or monitoring function of the controller and/or the modified control and/or monitoring function of the controller; and taking the first utilization level and the second utilization level as a basis for deciding to perform the new control and/or monitoring function of the controller and/or the modified control and/or monitoring function of the controller in the travel mode of the motor vehicle.

The method according to the third aspect of the invention can be carried out by the controller according to the first aspect of the invention. Therefore, further embodiments of the method according to the third aspect are set out by the further embodiments of the controller according to the first aspect, which are described above.

According to a fourth aspect, the invention relates to a computer program having a program code for carrying out the method according to the third aspect of the invention, if the computer program is run on a computer.

Aspects of the invention can be realized in software and/or in hardware.

BRIEF DESCRIPTION OF THE DRAWINGS

Further exemplary embodiments are explained in greater detail with reference to the appended figures, wherein.

DETAILED DESCRIPTION OF THE PREFERRED EMBODIMENTS

Figure 1:
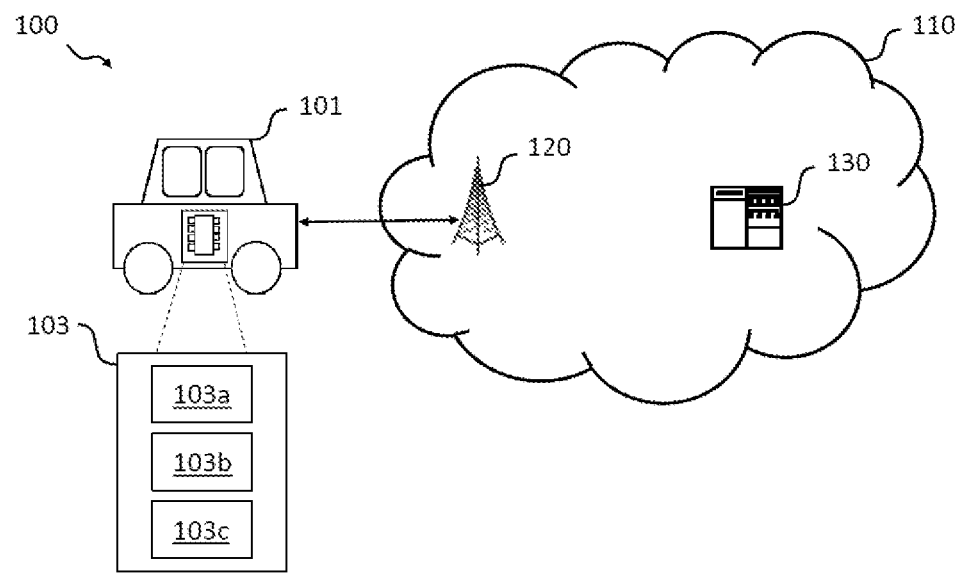
FIG. 1 shows a schematic diagram which shows a communication system with a motor vehicle having a controller according to an embodiment.

In the following detailed description, reference is made to the appended drawings, which form a part hereof and which show, by way of illustration, specific embodiments in which the invention can be performed. It is understood that other embodiments can also be used and structural or logical changes can be made without deviating from the concept of an aspect of the present invention. The following detailed description is therefore not to be understood in a limiting sense. It is further understood that the features of the various exemplary embodiments described herein can be combined with one another unless otherwise specifically indicated.

The aspects and embodiments are described with reference to the drawings, wherein the same reference numerals generally relate to the same elements. In the following description, numerous specific details are set out for explanatory purposes in order to convey a detailed understanding of one or more aspects of the invention. However, it can be obvious to a person skilled in the art that one or more aspects or embodiments can be performed with a lower degree of the specific details. In other cases, known structures and elements are represented in schematic form, in order to facilitate the description of one or more aspects or embodiments. It is understood that other embodiments can be used and structural or logical changes can be made without deviating from the concept of an aspect of the present invention.

Devices are described, and methods are described. It is understood that basic characteristics of the devices also apply to the method and vice versa. Therefore, in the interests of brevity, a double description of such characteristics is dispensed with. FIG. 1 shows a schematic diagram of a communication system 100. Part of this communication system is a motor vehicle, for example a passenger vehicle 101 having an electronic controller 103. The electronic controller 103 is designed to perform one or more control and/or monitoring functions of the motor vehicle 101. The electronic controller 103 can, for example, be an engine controller (also known as an ECU) or a controller which provides another control and/or monitoring function. The control and/or monitoring function can, for example, be an image camera processing function, a person detecting function, an automatic parking function and/or an automatic forward lighting switching function. According to an embodiment, the controller 103 comprises a real-time operating system which is run by the processor unit 103a, wherein the control and/or monitoring function is part of the real-time operating system.

The motor vehicle 101 is designed to communicate via one of the base stations 120 of a mobile radio network 110 with a backend server 130. As can be seen from the detailed schematic representation of the controller 103 in FIG. 1, the controller 103 comprises a processor unit 103a and a communication interface 103b. The controller 103 can further comprise a storage unit 103c.

The processor unit 103a of the controller 103 is designed to determine a first utilization level of the controller 103 during the travel mode of the motor vehicle 101. According to an embodiment, the processor unit 103a can be designed to capture a course of the utilization level of the controller 103 over a predetermined time interval during the travel mode, for example a pre-determined time interval of an hour, and to determine a maximum value of the course of the utilization level of the controller 103 as the first utilization level of the controller 103. The utilization level can, for example, be a utilization level of the processor unit 103a, a utilization level of the communication interface 103b, a utilization level of the storage unit 103c or a combination thereof. The utilization level can, for example, be determined as a relative utilization level in relation to a maximum utilization capacity. In order to update, for example, an existing control and/or monitoring function on the controller 103 or to provide a new control and/or monitoring function on the controller 103, the communication interface 103b is designed to receive a corresponding program code, for example from the backend server 130, via the mobile radio network 110. The program code defines a new control and/or monitoring function of the controller 103 and/or modifies an existing control and/or monitoring function of the controller 103. The program code can, for example, be provided within the framework of a method known as FOTA (Flashing over the Air). The program code can be saved in the storage unit 103c.

The processor unit 103a of the controller 103 is further designed to determine a second utilization level of the controller 103 in the standstill mode of the motor vehicle 101, in which the program code is taken as a basis for performing the new control and/or monitoring function of the controller 103 and/or the modified control and/or monitoring function of the controller 103. In other words: if the motor vehicle 101 is stopped, for example, the controller 103 performs the new control and/or monitoring function and/or the modified control and/or monitoring function which is/are defined by the received program code, and determines the utilization level of the controller 103 during the standstill mode.

It can be necessary with some control and monitoring functions that, in order to be performed, these require the input data which occur during the travel mode of the motor vehicle 101. Therefore, the processor unit 103a can be designed to collect and/or generate corresponding input data within the framework of determining the first utilization level of the controller 103 during the travel mode of the motor vehicle 101, i.e. in the travel mode with the controller 103, without the new or respectively modified control and monitoring function, and to perform the new control and/or monitoring function of the controller 103 and/or the modified control and/or monitoring function of the controller 103 with said input data in the standstill mode of the motor vehicle 101, in order to determine the second utilization level of the controller 103.

The processor unit 103a of the controller 103 is further designed to take the first utilization level and the second utilization level as a basis for deciding whether the capacities of the controller 103 are sufficient to perform the new control and/or monitoring function of the controller 103 and/or the modified control and/or monitoring function of the controller 103 as well during the travel mode of the motor vehicle 101. In an embodiment, the controller 103 can have a maximum utilization capacity and the processor unit 103a can be designed to perform the new control and/or monitoring function of the controller 103 and/or the modified control and/or monitoring function of the controller 103 in the travel mode of the motor vehicle 101, if the total of the first utilization level and the second utilization level is not greater than the maximum utilization capacity of the controller 103. In other words: the processor unit 103a can make the decision to perform the new control and/or monitoring function of the controller 103 and/or the modified control and/or monitoring function of the controller 103 in the travel mode of the motor vehicle 101, if the difference between the maximum utilization capacity of the controller 103 and the first utilization level of the controller 103, i.e. the utilization level of the controller 103 in the travel mode without the new or respectively modified control and/or monitoring function, is greater than the second utilization level, i.e. the utilization level of the controller 103 in the standstill mode with the new or respectively modified control and/or monitoring function.

Figure 2:
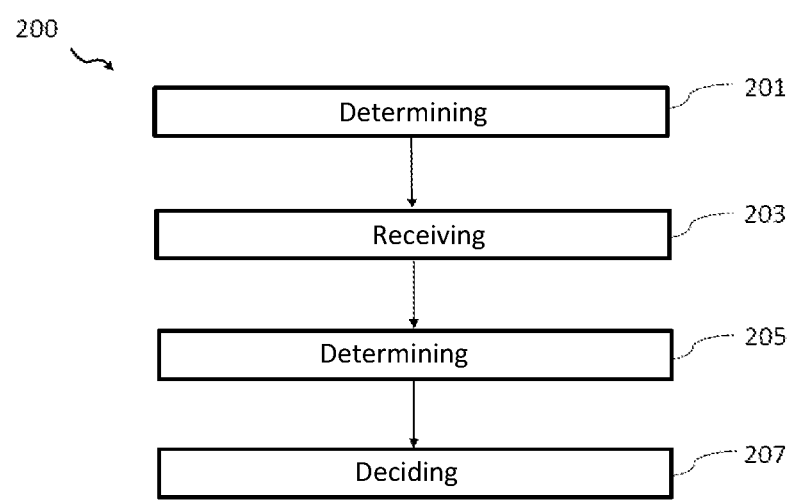
FIG. 2 shows a diagram of a method for operating a controller for a motor vehicle according to an embodiment.

FIG. 2 illustrates the steps of a corresponding method 200 for operating the controller 103 of the motor vehicle 101. The method 200 comprises the following steps: the determining 201 of the first utilization level of the controller 103 during the travel mode of the motor vehicle 101; the receiving 203 of the program code, wherein the program code defines the new control and/or monitoring function of the controller 103 and/or modifies an already existing control and/or monitoring function of the controller 103; the determining 205 of a second utilization level of the controller 103 in the standstill mode of the motor vehicle 101, in which the program code is taken as a basis for performing the new control and/or monitoring function of the controller 103 and/or the modified control and/or monitoring function of the controller 103; and taking the first utilization level and the second utilization level as a basis for deciding 207 whether the new control and/or monitoring function of the controller 103 and/or the modified control and/or monitoring function of the controller 103 can be performed in the travel mode of the motor vehicle 101.

LIST OF REFERENCE NUMERALS

100 Communication system
101 Motor vehicle
103 Controller
103a Processor unit
103b Communication interface
103c Storage unit
110 Mobile radio network
120 Base station
130 Backend server
200 Method
201 Determining a first utilization level
203 Receiving program code
205 Determining a second utilization level
207 Deciding

The invention claimed is:

1. A controller for a motor vehicle, wherein the controller is designed to perform one or more control and/or monitoring functions, wherein the controller comprises:
   a processor which is designed to determine a first utilization level of the controller during a travel mode of the motor vehicle; and
   a communication interface which is designed to receive a program code, wherein the program code defines a new control and/or monitoring function of the controller and/or modifies a control and/or monitoring function of the controller;
   wherein the processor is further designed to determine a second utilization level of the controller in a standstill mode of the motor vehicle, in which the program code is taken as a basis for performing the new control and/or monitoring function of the controller and/or the modified control and/or monitoring function of the controller, and to take the first utilization level and the second utilization level as a basis for deciding to perform the new control and/or monitoring function of the controller and/or the modified control and/or monitoring function of the controller in the travel mode of the motor vehicle.

2. The controller according to claim 1, wherein the processor is designed to capture a course of the utilization level of the controller over a predetermined time interval during the travel mode and to determine a maximum value of the course of the utilization level of the controller as the first utilization level of the controller.

3. The controller according to claim 2, wherein the controller has a maximum utilization capacity and the processor is designed to perform the new control and/or monitoring function of the controller and/or the modified control and/or monitoring function of the controller in the travel mode of the motor vehicle, if the total of the first utilization level and the second utilization level is not greater than the maximum utilization capacity of the controller.

4. The controller according to claim 1, wherein the processor is designed to collect and/or generate input data during the determination of the first utilization level of the controller during the travel mode of the motor vehicle, and to perform the new control and/or monitoring function of the controller and/or the modified control and/or monitoring function of the controller with the input data in the standstill mode of the motor vehicle, in order to determine the second utilization level of the controller.

5. The controller according to claim 1, wherein the control and/or monitoring function is at least one of an image camera processing function, a person detecting function, an automatic parking function, or an automatic forward lighting switching function.

6. The controller according to claim 1, wherein the second utilization level comprises the computing utilization of the processor of the controller during the performance of the new control and/or monitoring function of the controller and/or the modified control and/or monitoring function of the controller.

7. The controller according to claim 1, wherein the controller further comprises storage which is designed to store the program code.

8. The controller according to claim 7, wherein the second utilization level comprises the storage utilization of the storage of the controller during the storage of data in connection with the performance of the new control and/or monitoring function of the controller and/or the modified control and/or monitoring function of the controller.

9. The controller according to claim 1, wherein the communication interface is designed to receive the program code via a wireless interface.

10. The controller according to claim 1, wherein the communication interface is designed to receive the program code via a communication network from a backend server.

11. The controller according to claim 1, wherein the controller comprises a real-time operating system which is run by the processor, and the control and/or monitoring function is part of the real-time operating system.

12. A motor vehicle having a controller according to claim 1, wherein the motor vehicle is a passenger vehicle, a truck, an automobile, a motorcycle, an electric vehicle or a hybrid vehicle.

13. A method for operating a controller for a motor vehicle, wherein the controller is designed to perform one or more control and/or monitoring functions, wherein the method comprises:
  determining a first utilization level of the controller during a travel mode of the motor vehicle;
  receiving a program code, wherein the program code defines a new control and/or monitoring function of the controller and/or modifies a control and/or monitoring function of the controller;
  determining a second utilization level of the controller in a standstill mode of the motor vehicle, in which the program code is taken as a basis for performing the new control and/or monitoring function of the controller and/or the modified control and/or monitoring function of the controller; and
  taking the first utilization level and the second utilization level as a basis for deciding to perform the new control and/or monitoring function of the controller and/or the modified control and/or monitoring function of the controller in the travel mode of the motor vehicle.

14. A computer program having a program code for carrying out the method according to claim 13, if the program code is run on a computer.

15. The controller according to claim 1, wherein the controller has a maximum utilization capacity and the processor is designed to perform the new control and/or monitoring function of the controller and/or the modified control and/or monitoring function of the controller in the travel mode of the motor vehicle, if the total of the first utilization level and the second utilization level is not greater than the maximum utilization capacity of the controller.

16. The controller according to any claim 1, wherein the communication interface is designed to receive the program code via a mobile radio communication network from a backend server.

* * * * *